US012626549B2

(12) United States Patent
Ovaska et al.

(10) Patent No.: US 12,626,549 B2
(45) Date of Patent: May 12, 2026

(54) ELECTRONIC LOCK COMPRISING A LOCK-CORE SOFTWARE MODULE

(71) Applicant: ASSA ABLOY AB, Stockholm (SE)

(72) Inventors: Marko Ovaska, Helsinki (FI); Sampo Sutela, Helsinki (FI)

(73) Assignee: ASSA ABLOY AB, Stockholm (SE)

( * ) Notice: Subject to any disclaimer, the term of this patent is extended or adjusted under 35 U.S.C. 154(b) by 84 days.

(21) Appl. No.: 18/559,645

(22) PCT Filed: May 10, 2022

(86) PCT No.: PCT/EP2022/062671
§ 371 (c)(1),
(2) Date: Nov. 8, 2023

(87) PCT Pub. No.: WO2022/238424
PCT Pub. Date: Nov. 17, 2022

(65) Prior Publication Data
US 2024/0257589 A1 Aug. 1, 2024

(30) Foreign Application Priority Data
May 11, 2021 (SE) .................................... 2150597-9

(51) Int. Cl.
*G07C 9/00* (2020.01)
*G06F 21/55* (2013.01)
(Continued)

(52) U.S. Cl.
CPC ....... *G07C 9/00309* (2013.01); *G06F 21/554* (2013.01); *G07C 9/29* (2020.01); *H04L 9/30* (2013.01); *G06F 2221/034* (2013.01)

(58) Field of Classification Search
CPC ..... G07C 9/00309; G07C 9/29; G06F 21/554; G06F 21/74
See application file for complete search history.

(56) References Cited

U.S. PATENT DOCUMENTS 9,697,371 B1 * 7/2017 Willden ................. G06F 21/62
10,097,353 B1 10/2018 Carlson
(Continued)

FOREIGN PATENT DOCUMENTS

CN 112330853 2/2021
EP 3362931 5/2019
(Continued)

OTHER PUBLICATIONS

"PTO Notice 4 Months mailed Feb. 8, 2022", 10 pages.
(Continued)

*Primary Examiner* — Nabil H Syed
(74) *Attorney, Agent, or Firm* — Schwegman Lundberg & Woessner, P.A.

(57) ABSTRACT
An electronic lock for controlling access to a restricted physical space. The electronic lock comprises: electronically-controllable lock hardware; and a system-on-chip, SoC, comprising a processor and memory. The SoC comprises: a trusted environment comprising a secure data storage and a lock-core software module comprising instructions that, when executed by the processor, cause the electronic lock to: evaluate access for a user based on data stored in the secure data storage and control the lock hardware based on the evaluation; and an untrusted environment comprising untrusted software that is prevented from bypassing the lock-core software module to control the electronically-controllable lock hardware.

13 Claims, 2 Drawing Sheets

(51) Int. Cl.
    *G07C 9/29*        (2020.01)
    *H04L 9/30*        (2006.01)

(56) References Cited

U.S. PATENT DOCUMENTS

| | | |
|---|---|---|
| 2002/0097141 A1 | 7/2002 | Denison et al. |
| 2014/0258736 A1* | 9/2014 | Merchan .............. H04L 9/0866 |
| | | 713/193 |
| 2018/0248704 A1* | 8/2018 | Coode .................. H04L 9/0825 |
| 2019/0172298 A1 | 6/2019 | Just |
| 2021/0126976 A1 | 4/2021 | Chang et al. |

FOREIGN PATENT DOCUMENTS

| | | |
|---|---|---|
| WO | 2017066409 | 4/2017 |
| WO | 2022238424 | 11/2022 |

OTHER PUBLICATIONS

"PCT EP2022062671 Written Opinion mailed Mar. 24, 2023", 7 pages.
"PCT EP2022062671 IPRP mailed Sep. 6, 2023", 20 pages.
"PCT EP2022062671 ISR WO mailed Aug. 3, 2022", 14 pages.
Areno, Matthew, "", 2012 IEEE 11th International Conference on Trust, Security and Privacy in Computing and Communications, (Sep. 6, 2012), 6 pages.
Paul, Rourab, "Partitioned security processor architecture on FPGA platform", The Institution of Engineering and Technology vol. 12, Issue5, (Sep. 2018), 11 pages.

\* cited by examiner

ELECTRONIC LOCK COMPRISING A LOCK-CORE SOFTWARE MODULE

CROSS-REFERENCE TO RELATED APPLICATION(S)

This application is a national stage application under 35 U.S.C. § 371 of PCT Appl. No. PCT/EP2022/062671, titled "Electronic Lock Comprising a Lock-Core Software Module," filed May 10, 2022, which claims priority to Swedish Patent Appl. No. 2150597-9, filed May 11, 2021, each of which is incorporated herein by reference in its entirety.

TECHNICAL FIELD

The present disclosure relates to the field of an electronic lock for physical access and in particular to an electronic lock comprising a lock core software module that is separate from untrusted software.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

Electronic locks also need to be secure. Any bugs in software of the electronic lock should not open up the possibility of an attacker running malicious code on the lock which causes the electronic lock to be set in an unlocked state.

SUMMARY

One object is to provide an electronic lock that is better at preventing malicious code from accessing lock hardware.

According to a first aspect, it is provided an electronic lock for controlling access to a restricted physical space. The electronic lock comprises: electronically-controllable lock hardware; a system-on-chip, SoC, comprising a processor and memory; wherein the SoC comprises: a trusted environment comprising a secure data storage and a lock-core software module comprising instructions that, when executed by the processor, cause the electronic lock to: evaluate access for a user based on data stored in the secure data storage and control the lock hardware based on the evaluation; and an untrusted environment comprising untrusted software that is prevented from bypassing the lock-core software module to control the electronically-controllable lock hardware.

The lock-core software module may be trusted in a trusted execution environment of the SoC, verified using a public key stored in the secure data storage.

The lock-core software module may be installed during production of the electronic lock such that any unauthorized modification of the installed lock software module results in failed verification of trust in the trusted execution environment.

The electronic lock may further be configured to install an update of the lock-core software module, wherein the updated lock-core software module is verified using a public key stored in the secure data storage.

The lock-core software module may be configured to communicate with a remote server via the untrusted software, wherein end-to-end security is provided between the lock-core software module and the remote server based on data stored in the secure data storage.

The lock-core software module may be configured to evaluate access based on verifying a credential using a public key stored in the secure data storage.

The end-to-end security may be provided using PKI (Public Key Infrastructure).

The untrusted software may comprise software implementing communication protocols with devices external to the electronic lock.

All untrusted software may be verified using public keys stored in the secure data storage.

The SoC may be configured to prevent the untrusted software from controlling the electronically-controllable lock hardware by only allowing software in the trusted environment, verified using a cryptographic signature of the software, to control the electronically-controllable lock hardware.

The SoC may be configured to prevent the untrusted software from controlling the electronically-controllable lock hardware by only allowing software in the trusted environment to access address space that is assigned for communicating with the electronically-controllable lock hardware.

The SoC may be configured to prevent the untrusted software from controlling the electronically-controllable lock hardware using a low-level operating system of the SoC.

The SoC may be configured to prevent the untrusted software from controlling the electronically-controllable lock hardware using physical hardware isolation.

The SoC may be configured to prevent the untrusted software from controlling the electronically-controllable lock hardware using logical hardware isolation.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide improved security for electronic locks. This is achieved by only trusted lock-core software being allowed to access hardware that can be used to unlock the lock. There is also secure data storage that is only available for trusted software. The secure data storage comprises data (explained in more detail below) that enables secure access evaluation and secure control of the hardware. In this way, untrusted software, e.g. communication protocols, etc., are prevented from gaining access to the lock hardware. Hence, even if a security vulnerability or malicious code inserted in the communication software were to enable an attacker to execute code in the untrusted software, this would not be able to manipulate the lock to unlock (or lock). Access evaluation is performed in the trusted lock-core software, whereby the lock hardware can only be set in an unlocked state when access evaluation results in granted access. Compared to the prior art, the risk of a successful access software-based attack is significantly reduced.

Figure 1:
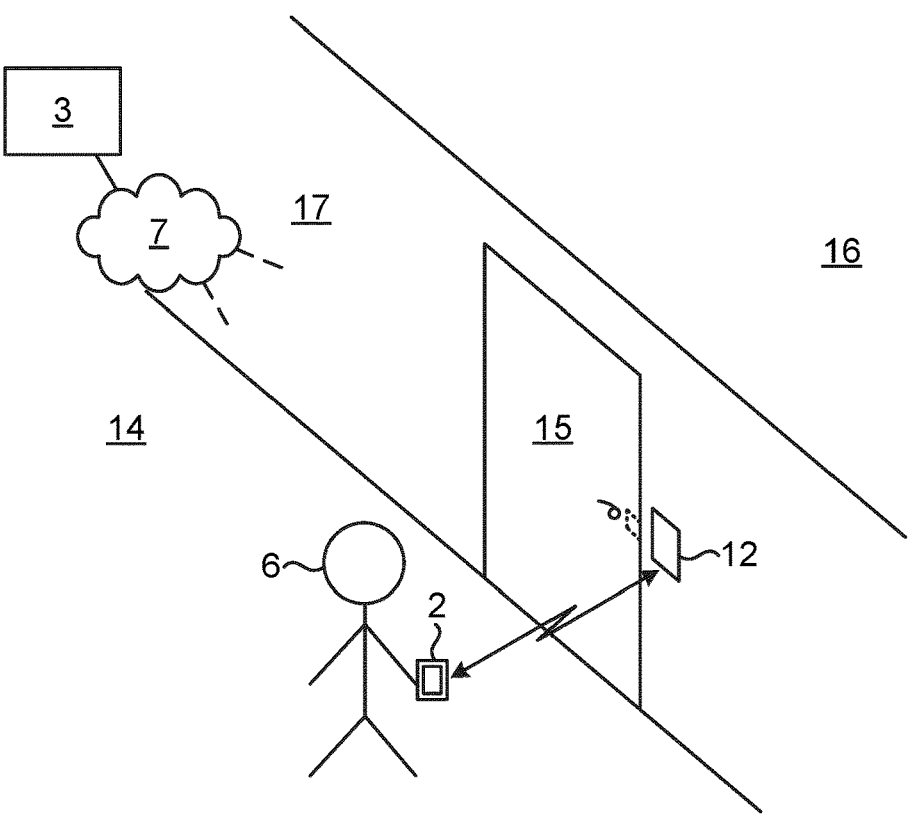
FIG. 1 is a schematic diagram illustrating an environment in which embodiments presented herein can be applied.

FIG. 1 is a schematic diagram illustrating an environment in which embodiments presented herein can be applied. Access to a physical space 16 is restricted by an openable physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. An electronic lock 12 is provided in order to control access to the physical space 16, by selectively unlocking the barrier 15.

The electronic lock 12 can be provided in a structure 17 (such as a wall) surrounding the barrier 15 (as shown) or the electronic lock 12 can be provided in the barrier 15 itself (not shown). The electronic lock 12 is controllable to be in a locked state or in an unlocked state.

A user 6 carries an electronic key 2. The electronic key 2 can be in any suitable format that allows an access control device to communicate (wirelessly or conductively) with the electronic lock 12 to evaluate whether to grant access. For instance, the electronic key 2 can be in the form of a key fob, a key card, a hybrid mechanical/electronic key or embedded in a smartphone. Depending on the access rights for the electronic key 2, it can be used to unlock the electronic lock 12. The evaluation of whether to grant access can be performed using any suitable process. For instance, the evaluation can be based on communication between the electronic lock 12 and the electronic key 2 to prove ownership of a shared secret. Alternatively or additionally, the evaluation can be based on a chain of delegations from a lock owner to the electronic key 2, where each delegation is a data item indicating the delegator and the delegatee, and the delegation is signed by the delegator. The first delegation in the chain would then have the lock owner as the delegator and the last delegation in the chain would have the electronic key 2 as the delegatee. Alternatively or additionally, the electronic lock 12 authenticates the electronic key 2 and/or authorizes access for the electronic key based on communication with a server 3.

Optionally, the server 3 is provided which can communicate with the key 2 and/or the electronic lock 12. Such communication can occur over a network 7, which can be an internet protocol (IP)-based network. The network 7 can e.g. comprise any one or more of a local wireless network, a cellular network, a wired local-area network, a wide-area network (such as the Internet), etc. The server 3 can e.g. support remote unlocking from a server application or from another user device.

Figure 2:
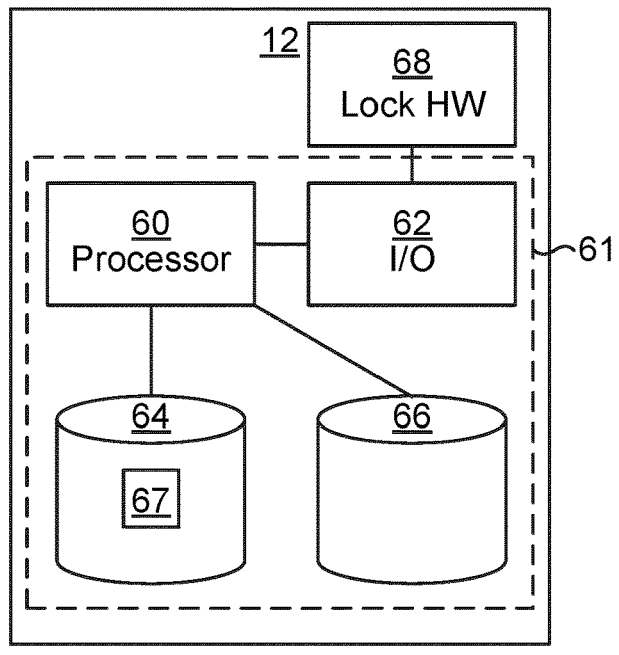
FIG. 2 is a schematic diagram illustrating components of the electronic lock of FIG. 1.

FIG. 2 is a schematic diagram illustrating components of the electronic lock 12 of FIG. 1. The electronic lock 12 comprises a system-on-chip (SoC) 61 and lock hardware 68. The SoC 61 is a compact implementation of a computer, e.g. on a single circuit-board or even on a single integrated circuit.

Optionally, part or all of the lock hardware 68 is provided on the same circuit-board as the SoC 61. The SoC comprises a processor 60 which is implemented using any combination of one or more of a suitable central processing unit (CPU), graphics processing unit (GPU), multiprocessor, microcontroller, digital signal processor (DSP), etc., capable of executing software instructions 67 stored in a memory 64 of the SoC 61. The processor 60 could alternatively be implemented, partly or completely, using an application specific integrated circuit (ASIC), field programmable gate array (FPGA), etc.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can e.g. comprise RAM and/or persistent storage.

The SoC 61 further comprises an I/O interface 62 for communicating with internal entities, such as the lock hardware 68, and external entities such as the electronic key 2 and the server 3. Optionally, the I/O interface 62 also includes a user interface.

The lock hardware 68 can e.g. comprises a motor and/or solenoid for controlling mechanics such that the electronic lock 12 to assume a locked or unlocked state.

Other components of the electronic lock 12 are omitted in order not to obscure the concepts presented herein.

Figure 3:
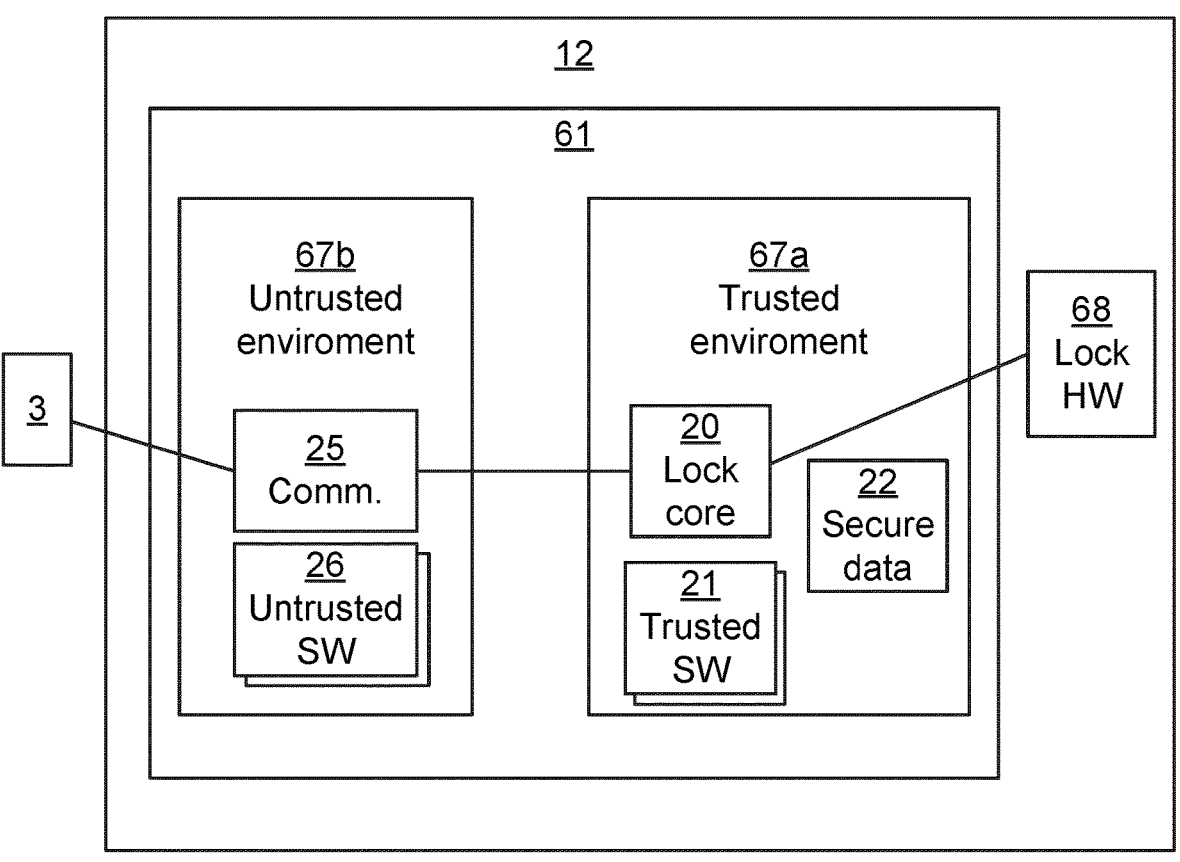
FIG. 3 is a schematic diagram illustrating functional architecture of the electronic lock.

FIG. 3 is a schematic diagram illustrating functional architecture of the electronic lock 12. On the SoC 1, there is a trusted environment 67a and an untrusted environment 67b.

The trusted environment 67a comprises a lock-core software module 20 that comprises instructions that, when executed by the processor, cause the electronic lock 12 to: evaluate access for a user 6 and control the lock hardware 68 based on the evaluation. The lock-core software module 20 is trusted in a trusted execution environment of the SoC 61, verified using public key infrastructure (PKI), based on key pairs consisting of a public key and a secret key. In this way, it is the lock-core software module that, in its evaluation of access, authorises the electronic key 2 of the user 6. This is thus performed in the trusted environment 67a.

The secure data storage 22 contains the public keys for the SoC manufacturer (for verifying the initial boot sequence) and for the lock manufacturer (for verifying lock software in the boot sequence, and for verifying the lock-core software module 20 and optionally other software in the trusted environment 67a). Moreover, the secure data storage 22 can contain a public key for the server 3 for authorisation/authentication communication. For instance, the lock-core software module 20 can be configured to only communicate with servers (in end-to-end secure communication) for which a public key is found in the secure data storage 22. This prevents attacks from other entities on the Internet.

Optionally, the lock-core software module 20 is installed during production of the electronic lock 12 such that any unauthorized modification of the installed lock-core software module 20 results in failed verification of trust in the trusted execution environment. This can be achieved by an (electronic) cryptographic signature that is required for any software to be considered to be trusted, based on a secret key, e.g. associated with the manufacturer or other party deemed to be trusted and for which a public key is installed in the SoC.

The trusted environment 67a also comprises secure data 22 that is unreadable from the untrusted environment 67b. In other words, the secure data 22 is only readable from the trusted environment 67a. The secure data 22 can e.g. comprise secret keys and/or, identity of the SoC 61 and/or the electronic lock 12 and/or public key(s) for verifying signatures of trusted software modules, such as the lock-core software module 20 and for verifying signatures of untrusted software modules 25, 26 in the untrusted environment 67b. This structure also allows an update of the lock-core software module (or any other module) to be installed. The updated lock-core software module 20 is then verified using a public key stored in the secure data storage 22.

The trusted environment 67a further comprises other trusted software 21, which includes low-level components, such as bootloader, for ensuring the proper separation between the trusted environment 67a and untrusted environment 67b, and for verifying that the lock-core software module 20 is a trusted software module. This verification can be based on verification of a cryptographic signature of the lock-core software module 20, applied using secret key e.g. of the manufacturer of the electronic lock 12. The cryptographic signature is verified against a public key (corresponding to the secret key) which is stored in the secure data storage 22.

The trusted environment 67a can be implemented e.g. according to the following. On boot, the SoC vendor initial boot sequence is loaded into the secure area 67a and is executed. This SoC vendor boot sequence is verified against a firmware public key that is stored in the secure data storage 22. The lock then proceeds to a lock boot phase, where any lock boot sequence software is verified against a vendor public key stored in the secure data 22 in the firmware. These public keys are stored in the secure data storage 22, which is accessible only to software in the trusted environment 67a.

The untrusted environment 67b is prevented from bypassing the lock-core software module 20 to control the electronically controllable lock hardware 68. The untrusted environment 67b is not trusted in the trusted execution environment of the SoC. The low-level operating system ensures that only software in the trusted environment 67a is allowed to access address space or other interface components for communicating with the lock hardware 68, and optionally other protected hardware.

The SoC 61 can thus prevent the untrusted software 25, 26 from controlling the electronically-controllable lock hardware 68 by only allowing software in the trusted environment 67a (verified using a cryptographic signature of the software) to control the electronically-controllable lock hardware 68.

In one embodiment, only software in the trusted environment 67a is allowed to access address space that is assigned for communicating with the electronically-controllable lock hardware 68.

In one embodiment, the untrusted software 25, 26 is prevented from controlling the electronically-controllable lock hardware 68 using a low-level operating system of the SoC 61. The low-level operating system can then e.g. enforce that only trusted software (software in the trusted environment 67a) is capable of addressing the address space (i.e. memory addresses) that is assigned for communicating with the electronically-controllable lock hardware 68. This can be implemented by the operating system categorising each software module as trusted or untrusted prior to execution, or in real-time when each software module is invoked or executed.

In one embodiment, the untrusted software 25, 26 is prevented from controlling the electronically-controllable lock hardware 68 using physical hardware isolation. For instance, the trusted environment can be one physical section of memory for storing software, while the untrusted environment can be another physical section of the memory for storing software. Alternatively or additionally, the untrusted software 25, 26 is prevented from controlling the electronically-controllable lock hardware 68 using logical hardware isolation, e.g. by assigning separate memory spaces for the trusted environment and the untrusted environment.

The untrusted environment 67b can e.g. comprises communication software 25 implementing communication protocols with devices external to the electronic lock. Such communication protocols can e.g. include any one or more of Bluetooth, Bluetooth Low Energy (BLE), Near-Field Communication (NFC), ZigBee, WiFi (IEEE 802.11x), etc. Other untrusted software 26 can also be provided in the untrusted environment 67b. One or more parts of the communication software 25 and/or other untrusted software 26 can be provided using third-party libraries.

The untrusted software modules 25, 26 can also be verified against public keys stored in the secure data storage 22. In this way, only software modules that are authorised e.g. by the manufacturer of the electronic lock 12, can be installed on the electronic lock 12. In other words, there is the highest level of security for the trusted environment 67a, in which trusted software modules can access the secure data storage 22 and the lock hardware 68. The untrusted software modules 25, 26 might not be trusted to access the secure data storage 22 and the lock hardware 68, but these modules are still verified against the public key to prevent an attacker from installing random (not validly signed) attack software on the electronic lock 12.

The lock-core software module 20 can communicate with a remote server 3 and/or the electronic key via the untrusted communication software 25 without the communication software 25 being able to directly access the lock hardware 68 (via a driver in the trusted environment 67a of directly without an intermediate driver). End-to-end security can be provided between the lock-core software module 20 and the remote server 3 or electronic key 2, e.g. using PKI based on public keys stored in the secure data storage 22. The public key in the secure data storage 22 can alternatively or additionally be used by the lock-core software module 20 for verifying a credential that is received for evaluating access. In this case, the credential can be received over local communication (such as Bluetooth, Bluetooth Low Energy (BLE) or NFC (Near-Field Communication)) from a credential carrier, such as a smartphone, key card, etc, whereby the electronic lock 21 can be configured to be off-line and mainly communicate locally with the credential carrier. Since the public key is stored in the secure data storage, the original source of the credential can still be verified by checking the cryptographic signature against the public key stored in the secure data storage.

In this way, if any code in the untrusted environment 67b causes a security breach, e.g. by a bug in the software and/or malicious code inserted in the software prior to generating its signature, to run malicious code, such code is prevented from accessing the lock hardware 68. This is due to that it is only trusted software, such as the lock-core software module 20, that has access to the interface with the lock hardware 68. In other words, any untrusted environment 67b must interface with the lock core software module 20 in order to change the state of the electronic lock 12, e.g. to open the lock. Since it is the lock core software module 20 that evaluates whether to evaluate access, only by provided credentials that are authenticated and authorized credentials by the lock-core software module 20 can any untrusted software contribute to unlocking the lock 12. The communication module 25 of the untrusted environment 67b can e.g. obtain such credentials from an electronic key. The data flow between the communication module 25 and the lock core module 20 can be abstracted and accessed using an API (Application Programming Interface). This API can be based on a shared memory that is accessible for reading and writing for both the communication module 25 and the lock core module 20, implementing a bi-directional communication interface. The receiving module can receive data by polling the shared memory. The shared memory can be a dual-ported RAM memory.

In this way, the communication modules 25 can safely be obtained e.g. from third-party sources and even if security leaks were to be found in such communication modules, and even if any malicious code is made to execute in the electronic lock, such malicious code is unable to control the lock hardware, e.g. to set the electronic lock 12 in an unlocked state.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An electronic lock for controlling access to a restricted physical space, the electronic lock comprising:
   electronically-controllable lock hardware; and
   a system-on-chip, SoC, comprising a processor and memory;
   wherein the SoC comprises:
      a trusted environment comprising a secure data storage and a lock-core software module comprising instructions that, when executed by the processor, cause the electronic lock to: evaluate access for a user based on data stored in the secure data storage and control the lock hardware based on the evaluation, wherein the access is evaluated based on credentials, from an electronic key of the user, that are authenticated and authorized by the lock-core software module; and an untrusted environment comprising untrusted software that is prevented from bypassing the lock-core software module to control the electronically-controllable lock hardware;
   wherein the lock-core software module is trusted in a trusted execution environment of the SoC, verified using a cryptographic signature of the lock-core software module and a public key for at least one of a manufacturer of the electronic lock or a manufacturer of the SoC, the public key being stored in the secure data storage.

2. The electronic lock according to claim 1, wherein the lock-core software module is installed during production of the electronic lock such that any unauthorized modification of the installed lock software module results in failed verification of trust in the trusted execution environment.

3. The electronic lock according to claim 1, wherein the electronic lock is further configured to install an update of the lock-core software module, wherein the updated lock-core software module is verified using a public key stored in the secure data storage.

4. The electronic lock according to claim 1, wherein the lock-core software module is configured to communicate with a remote server via the untrusted software, wherein end-to-end security is provided between the lock-core software module and the remote server based on data stored in the secure data storage.

5. The electronic lock according to claim 4, wherein the end-to-end security is provided using PKI, public key infrastructure.

6. The electronic lock according to claim 1, wherein the lock-core software module is configured to evaluate access based on verifying a credential using a public key stored in the secure data storage.

7. The electronic lock according to claim 1, wherein the untrusted software comprises software implementing communication protocols with devices external to the electronic lock.

8. The electronic lock according to claim 1, wherein all untrusted software is verified using public keys stored in the secure data storage.

9. The electronic lock according to claim 1, wherein the SoC is configured to prevent the untrusted software from controlling the electronically-controllable lock hardware by only allowing software in the trusted environment, verified using a cryptographic signature of the software, to control the electronically-controllable lock hardware.

10. The electronic lock according to claim 1, wherein the SoC is configured to prevent the untrusted software from controlling the electronically-controllable lock hardware by only allowing software in the trusted environment to access address space that is assigned for communicating with the electronically-controllable lock hardware.

11. The electronic lock according to claim 1, wherein the SoC is configured to prevent the untrusted software from controlling the electronically-controllable lock hardware using a low-level operating system of the SoC.

12. The electronic lock according to claim 1, wherein the SoC is configured to prevent the untrusted software from controlling the electronically-controllable lock hardware using physical hardware isolation.

13. The electronic lock according to claim 1, wherein the SoC is configured to prevent the untrusted software from controlling the electronically-controllable lock hardware using logical hardware isolation.

* * * * *